United States Patent
Heath et al.

(10) Patent No.: US 9,856,930 B2
(45) Date of Patent: Jan. 2, 2018

(54) BI-DIRECTIONAL OVERRUNNING CLUTCH WITH OUTER SPRING FOR A DRIVE AXLE

(71) Applicant: The Hilliard Corporation, Elmira, NY (US)

(72) Inventors: Kelly P. Heath, Corning, NY (US); David C. Ochab, Horseheads, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 15/071,751

(22) Filed: Mar. 16, 2016

(65) Prior Publication Data

US 2017/0268584 A1    Sep. 21, 2017

(51) Int. Cl.
| F16D 41/08 | (2006.01) |
|---|---|
| F16D 41/067 | (2006.01) |
| B60K 17/02 | (2006.01) |
| F16D 41/06 | (2006.01) |
| B62D 11/00 | (2006.01) |

(52) U.S. Cl.
CPC ......... *F16D 41/088* (2013.01); *F16D 41/067* (2013.01); *B60K 17/02* (2013.01); *B62D 11/00* (2013.01); *F16D 2041/0605* (2013.01)

(58) Field of Classification Search
None
See application file for complete search history.

(56) References Cited

U.S. PATENT DOCUMENTS

| 1,175,300 | A | * | 3/1916 | Ross | F16H 48/12 |
|---|---|---|---|---|---|
| | | | | | 74/650 |
| 3,447,396 | A | * | 6/1969 | Seliger | F16D 41/105 |
| | | | | | 192/45.006 |
| 3,700,082 | A | * | 10/1972 | Schwab | F16D 41/105 |
| | | | | | 192/50 |
| 4,373,407 | A | | 2/1983 | Okubo | |
| 5,971,123 | A | | 10/1999 | Ochab et al. | |
| 6,722,484 | B2 | | 4/2004 | Ochab et al. | |
| 7,490,708 | B2 | | 2/2009 | Irikura et al. | |
| 8,919,513 | B2 | | 12/2014 | Heath et al. | |
| 2005/0067248 | A1 | * | 3/2005 | Takasu | F16D 41/067 |
| | | | | | 192/45.1 |
| 2007/0010366 | A1 | * | 1/2007 | Larin | F16D 41/064 |
| | | | | | 475/249 |

\* cited by examiner

*Primary Examiner* — Mark A Manley
(74) *Attorney, Agent, or Firm* — Drinker Biddle & Reath LLP

(57) ABSTRACT

A bi-directional overrunning clutch for transmitting torque to drive axle halves includes a clutch housing that attaches to an input gear, and hubs that attach to the axle halves. A pair of roll cages located within the housing adjacent to the hubs have rollers. The rollers wedge between the hubs and first tapered portions on the clutch housing when the roll cage is rotated forward relative to the housing, and between the hubs and second tapered portions on the clutch housing when the roll cage is rotated in the opposite direction. Springs hold the rollers engaged with recesses in the hubs, but let the rollers lift to permit relative rotation of the hubs and roll cages. Relative rotation between the roll cages is limited: when one roll cage is wedged, the other can move only as far as a free position midway between the first and second tapered portions.

17 Claims, 6 Drawing Sheets

TURNING LEFT

TURNING RIGHT

BI-DIRECTIONAL OVERRUNNING CLUTCH WITH OUTER SPRING FOR A DRIVE AXLE

RELATED APPLICATION

The present application refers to commonly assigned U.S. Pat. No. 6,722,484, which is incorporated herein by reference in its entirety.

FIELD OF THE INVENTION

The present invention is directed to clutches and, more particularly, to a bi-directional overrunning clutch for controlling torque transmission to a drive shaft of a wheeled machine.

BACKGROUND OF THE INVENTION

In recent years there has been a tremendous demand for adding motor propulsion to what had previously been manual propelled machines. One example of such a device is ride-on and walk-behind power equipment. Walk-behind devices were once solely push-propelled. However, recently more models have become self-propelled. Examples of such equipment are lawnmowers, lawn vacuums, snowblowers, trimmers, edgers, concrete and asphalt cutters and the like. A number of factors have driven the move to self-propulsion, such as a desire for larger equipment which requires less effort and allows for more detailed control. Speed of operation is another factor that has driven the increase demand for self-propelled equipment. Current self-propulsion systems for walk-behind equipment generally fall into two categories, simple and complex.

In a simple type drive system, a drive shaft or belt is connected to a single drive axle which drives two wheels, one at each end of the axle. Because the wheels are on a common shaft, they rotate at the same rate. The principal deficiency with this type of device is that no differential rotation is permitted between the drive wheels. As a result, the machine is not efficient during cornering, which requires the outer wheel to travel a greater distance than the inner wheel. Because the outer wheel travels farther than the inner wheel in the same amount of time, the outer wheel should rotate faster than the inner wheel. When the outer and inner wheels are fixed to a common axle, however, that differential rotation is not permitted. The result is that either the inner wheel is driven faster or the outer wheel is driven slower than is optimum for the speed of the vehicle. In either case, cornering the equipment requires one of the wheels to slip or skid. That results in premature wear of the wheel.

Difficulty with cornering and wheel slippage are two major disadvantages with using equipment having drive wheels fixed to a common axle. Additionally, effort by the operator must be provided to overcome the ground-engaging forces to allow one wheel to slip. Furthermore, wheel slippage can cause damage to the surfaces on which the equipment is operating, as well as accelerated tire wear. For instance, turning a lawnmower with this type of drive system damages the turf under the slipping wheel.

Complex drive systems for self-propelled, walk-behind power equipment generally provide a differential between the pair of drive wheels. The differential permits independent or differential rotation of the drive wheels on an axle when the user corners. Many drive systems with differentials use some form of an overrunning clutch to transmit torque when needed to a driven shaft, while allowing a wheel to turn faster than the motor drive when necessary. One successful use of an overrunning clutch in an all terrain vehicle incorporates overrunning clutches where the wheel hub mounts to the axle, thus allowing each wheel to independently disengage when required.

Conventional complex differentials and overrunning clutches are generally costly to manufacture and, thus, relegated to more expensive vehicles, such as cars and four wheel drive vehicles.

A need exists for a less complex and less expensive bi-directional overrunning clutch that can be used in various self-propelled machines and light duty vehicles, such as snowblowers, lawn mowers, golf carts, and concrete and asphalt cutters.

Commonly assigned U.S. Pat. No. 6,722,484 describes a bi-directional overrunning clutch that allows the motor to drive both wheels in either direction when proceeding in a straight line, and on corners allows the motor to drive the slower (inside) wheel, while allowing the outside wheel to turn faster, without the need for a complex differential. U.S. Pat. No. 6,722,484 is incorporated herein by reference in its entirety. The clutch disclosed in U.S. Pat. No. 6,722,484 has proven very satisfactory. However, there is still room for further improvement.

SUMMARY OF THE INVENTION

According to an aspect of the present invention, there is provided an overrunning clutch for controlling torque transmission to a pair of shaft segments of a drive axle in a wheeled machine. A clutch housing is adapted to be engaged to and rotated by an input. The clutch housing has an inner cam surface on it. A pair of hubs are each adapted to engage an end of one of a shaft segment of a drive axle for rotation therewith. Each hub has a plurality of axially-extending recesses on an outer surface. A pair of roller assemblies are disposed within the clutch housing, each roller assembly including a set of rollers positioned around at least a portion of one of the hubs, a roll cage having a plurality of slots, each roller being located within a slot, the roll cage being located about at least a portion of the respective hub, and a spring tending to urge the rollers radially inwards to seat in respective ones of the recesses in the respective hub. Each roller assembly is located adjacent to the inner cam surface. The inner cam surface is adapted to provide wedging engagement of the rollers between the inner cam surface and the respective hub when the roll cage is rotated in a first direction relative to the clutch housing into a forward-engagement position and when the roll cage is rotated in a second direction relative to the clutch housing into a reverse-engagement position, the second direction of rotation being opposite the first direction of rotation. The inner cam surface defines a released position of the rollers between the forward-engagement position and the reverse-engagement position in which radially outward movement of the rollers is permitted against the action of the springs to free the rollers from the recesses in the respective hub to permit relative rotation of the hub and the respective roller assembly. The roll cages engage each other for limited relative rotation such that when one roller assembly is in one of the forward-engagement position and the reverse-engagement position, the other roller assembly can move between the same one of the forward-engagement and reverse-engagement positions and the released position, but cannot move into the other of the forward-engagement position and the reverse-engagement position.

The foregoing and other features of the invention and advantages of the present invention will become more apparent in light of the following detailed description of the preferred embodiments, as illustrated in the accompanying drawings. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
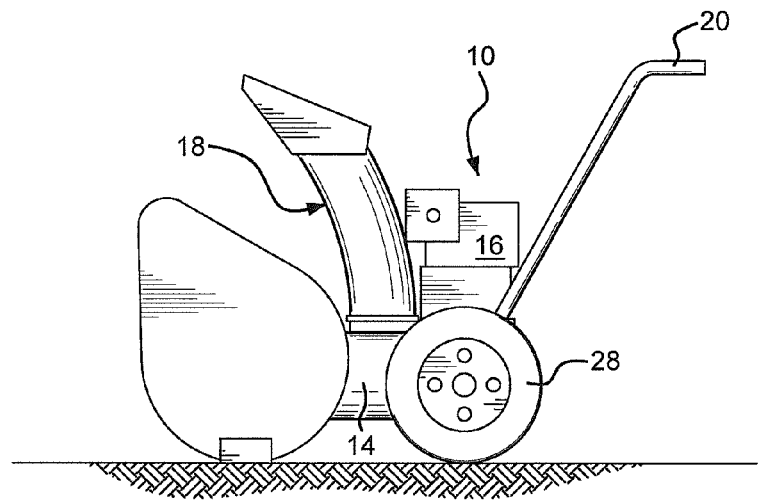
FIG. 1 is a side view of a vehicle incorporating the present invention.
Figure 2:
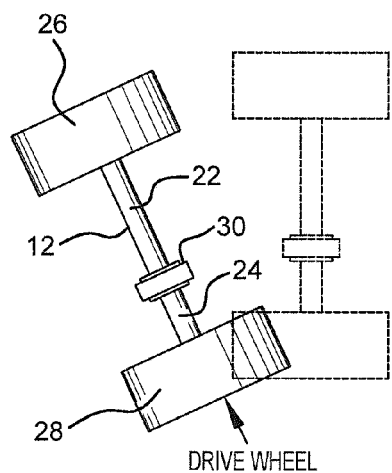
FIG. 2 is a schematic illustration of the wheels, axle and clutch of the vehicle of FIG. 1 turning left.
Figure 3:
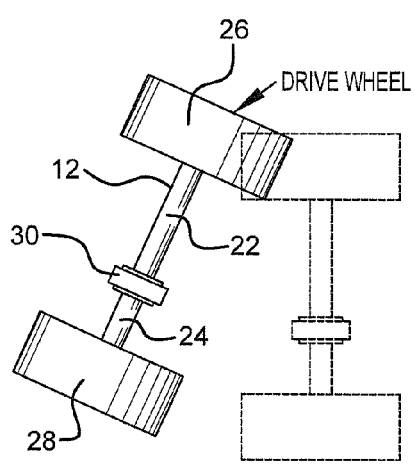
FIG. 3 is a schematic illustration of the wheels, axle and clutch of the vehicle of FIG. 1 turning right.

Referring now to the drawings, wherein like reference numerals illustrate corresponding or similar elements throughout the several views, FIGS. 1 to 3 illustrate a vehicle 10, in this embodiment a snow-blower, that incorporates a bi-directional overrunning clutch according to the present invention. The vehicle 10 includes a drive axle 12 that is supported for rotation with respect to a frame 14 in a conventional manner A motor 16 provides the power for a blower assembly 18 as well as power for propelling the vehicle 10 as will be described in greater detail. A handle 20 is connected to the frame 14 to provide for walk-behind operation of the vehicle.

The drive axle 12 includes separate shaft segments 22, 24 that are connected to wheels 26, 28, respectively, for rotation therewith. Each of the shaft segments 22, 24 is also connected at an opposite, proximal end to a bi-directional overrunning clutch 30 that is engageable to the motor 16. The connection can be through any conventional means, but in the illustrated embodiment is a splined connection between each shaft segment 22, 24 and a hub 32, 34 of the bi-directional overrunning clutch 30.

The bi-directional overrunning clutch 30 is constructed to transfer torque to the shaft segments 22, 24 for driving the wheels 26, 28. As will be described in greater detail, the construction of the clutch 30 facilitates turning of the vehicle 10 by allowing an outer wheel and the associated shaft segment to rotate faster than the inner wheel and associated shaft segment, which remain positively driven by the motor 16 through the clutch 30. Thus, the clutch 30 permits the outer wheel to independently rotate while the inner wheel continues to drive the machine. The drive axle 12 and wheels 26, 28 are shown in dashed line in FIGS. 2 and 3 being driven along a straight path to the left and in solid line being driven though turns. In the left turn illustrated in FIG. 2, wheel 26 is allowed to overrun clutch 30 while wheel 28 remains a positively driven wheel. In the right turn shown in FIG. 3, wheel 28 overruns while wheel 26 is positively driven by clutch 30.

Figure 4:
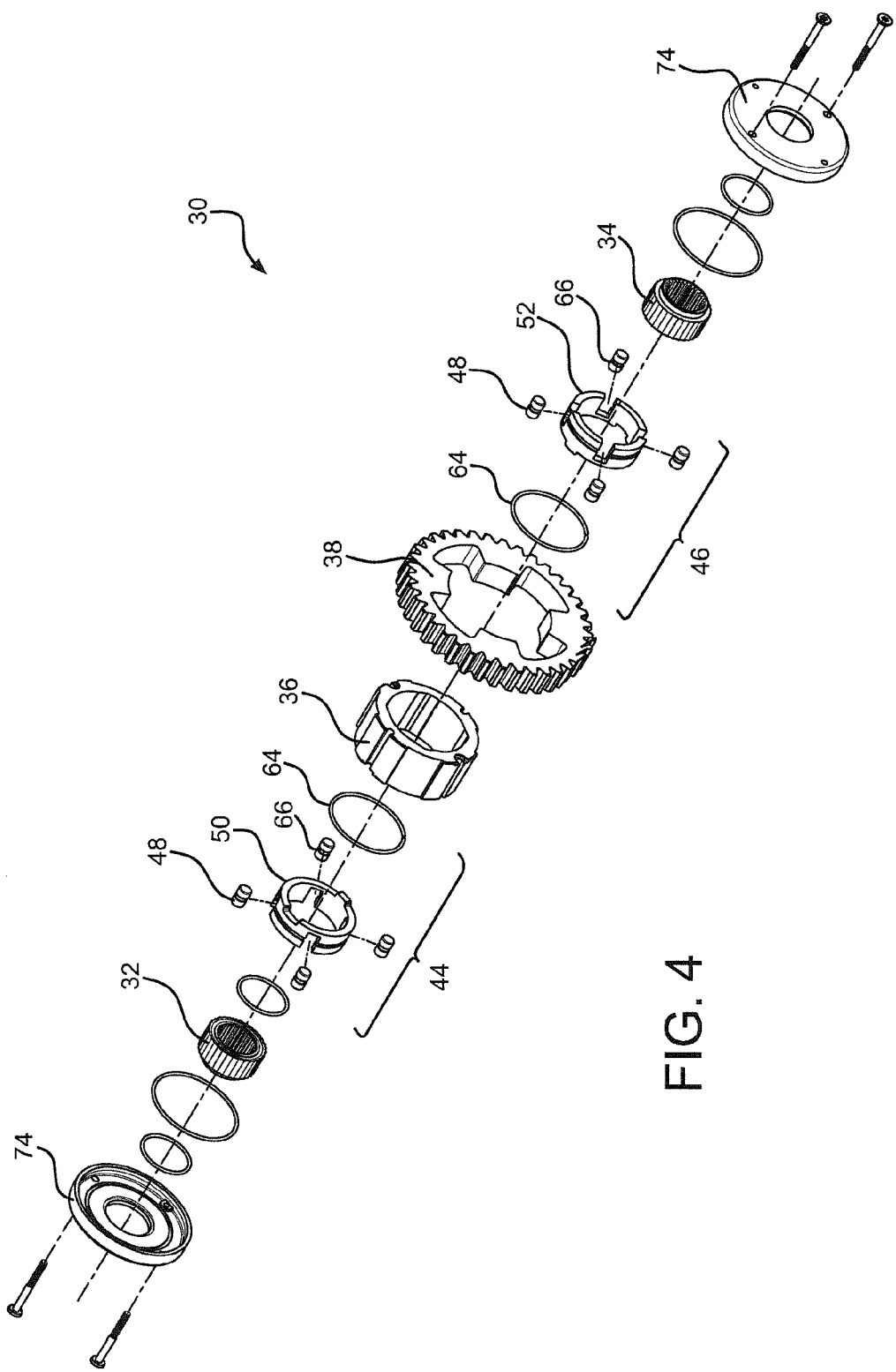
FIG. 4 is an exploded view of an embodiment of a clutch assembly.
Figure 5:
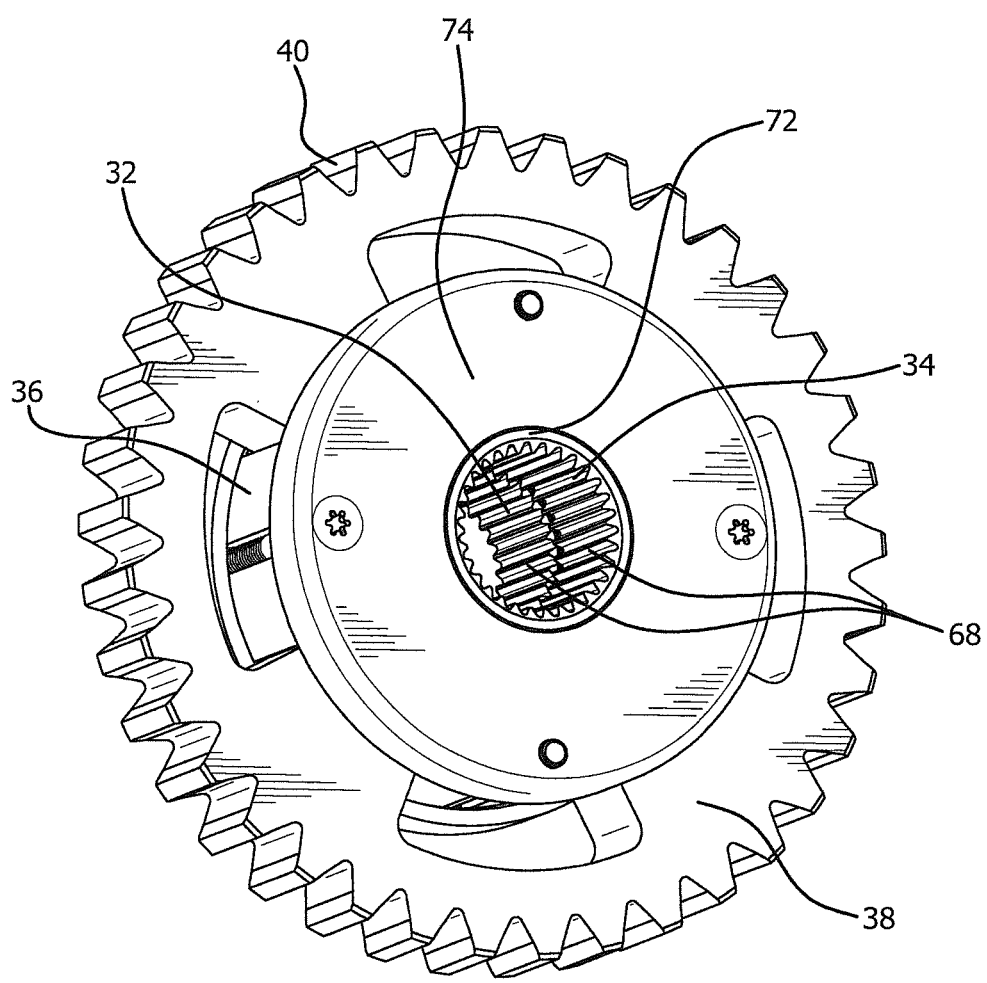
FIG. 5 is a perspective view of the clutch assembly of FIG. 4.

Referring to FIGS. 4 and 5, the clutch 30 includes a clutch housing 36 having a gear 38 mounted on or engaged to the outside of the clutch housing 36. The gear 38 has teeth 40 which, as will be well understood by one skilled in the art, are adapted to engage cooperatively formed teeth of a motor-driven gear (not shown) for transmitting rotation from a drive shaft of the motor 16 to the clutch housing 36. Also, while the gear 38 is shown as a separate component that is attached to the clutch housing 36, it should be readily apparent that the gear teeth 40 may be formed integral with the clutch housing 36. Alternatively, the gear 38 may be replaced by a sprocket, pulley, or other structure suitable to receive driving force or torque directly or indirectly from motor 16, and cause the clutch housing 36 to rotate.

Referring now also to FIGS. 6 to 10, the clutch housing 36 includes an inner cam surface 42, for transferring rotation of the clutch housing 36 to other components of the clutch 30 as will be described in greater detail below.

The clutch 30 further includes a pair of roller assemblies 44, 46 having rollers 48 arranged in two sets, preferably of four rollers each, although other number of rollers can be used in the present embodiment. Each of the roller assemblies 44, 46 also includes a roll cage 50, 52 for rotatably supporting the rollers 48. Each of the roll cages 50, 52 includes spaced slots or recesses 54 formed on an outer side of the cage 50, 52. The slots 54 are sized to receive the rollers 48. Each cage 50, 52 receives one set of rollers 48.

Figure 7:
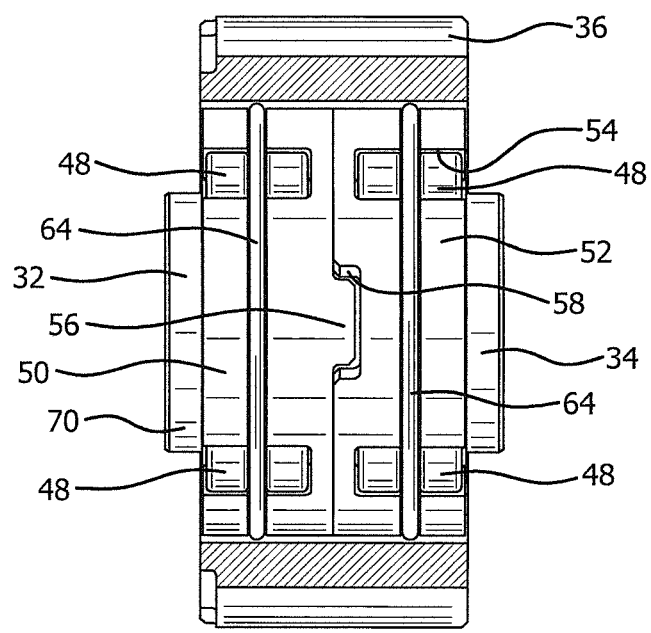
FIG. 7 is a front view of the clutch in FIG. 6, with part of the housing cut away.
Figure 10:
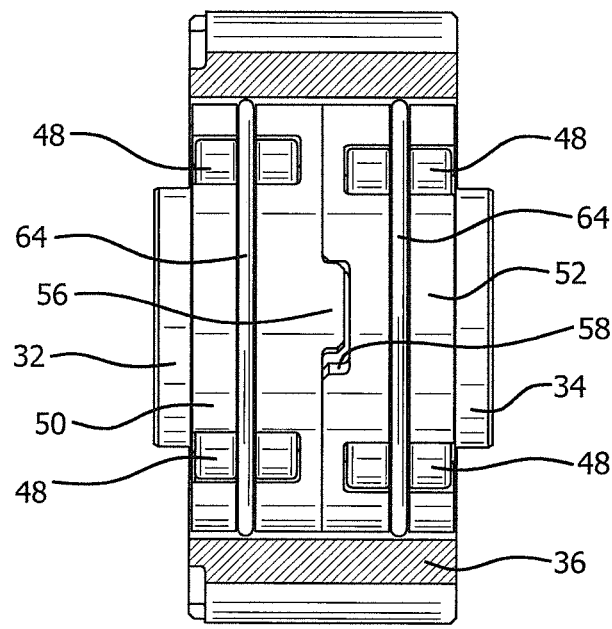
FIG. 10 is a front view similar to FIG. 7 of the clutch in the condition of FIG. 9.

As best seen in FIGS. 7 and 10, the roll cages 50, 52 are connected at their inner ends by a boss or tongue 56 on one roll cage engaging in a notch 58 in the other roll cage. Preferably, there are at least two tongues 56 and respective notches 58, evenly spaced around the circumference of the roll cages 50, 52. Each tongue 56 is shorter in the circumferential direction than its associated notch 58, allowing a small amount of relative rotation between the two roll cages 50, 52, while the tongue 56 remains engaged in the notch 58. The amount and purpose of this limited rotation will be explained below.

Each of the hubs 32, 34 is formed on its exterior surface with a scalloped surface 60 consisting of part-cylindrical or curved recesses 62 that extend parallel to the axis of the clutch 30. The recesses 62 are dimensioned to receive the rollers 48 but permit rotation. The number of recesses 62 in each hub 32, 34 is a multiple of the number of rollers 48 in each set, so that in a resting position all of the rollers 48 are seated in respective ones of the recesses 62.

Each roll cage 50, 52 is encircled by a garter spring 64 that lies in grooves 66 in the rollers 48 in that roll cage. In the resting position, the garter springs 64 bear on the bottoms of the grooves 66 and hold the rollers 48 seated in the recesses 62 in the hubs 32, 34. The grooves 66 are sufficiently deep that the rollers 48 project outwards beyond the garter springs 64.

As shown in the drawings, the hubs 32, 34 have splines 68 formed on an inner surface thereof for receiving splined ends of the shaft segments 22, 24. Of course, the hub may instead include a stub shaft portion with outer splines for engaging with inner splines on a shaft segment. Other types of well-known connections can be substituted for the illustrated splines. The splined connection secures the hubs 32, 34 to the shaft segments 22, 24 such that each of the hubs 32, 34 rotates in combination with one of the shaft segments 22, 24.

Referring again to FIG. 7, each of the hubs 32, 34 includes at an outer end, opposite the end with the tongue(s) 56 and/or notch(es) 58, a second portion 70 having an outer surface that is preferably reduced in diameter with respect to that of the scalloped surface 60. The reduced diameter portion 70 is preferably sized to extend through a central opening 72 in one of opposite covers 74. The covers 74 are fastened to the clutch housing 36 to form a closed whole, which may contain grease or other lubricant and may be sealed by O-rings or similar components between the two hubs 32, 34 and between each hub and one of the covers 74.

The operation of the bi-directional overrunning clutch 30 will now be described in more detail. Although the drawings illustrate the incorporation of the bi-directional overrunning clutch in a walk-behind single axle snowblower 10, it will become quite apparent from the following discussion that the present invention is not limited to use with only a snowblower. Instead, the present invention can be used with any suitable machine that has a drive axle with two shaft segments that are driven from a common motor or other power supply.

Figure 6:
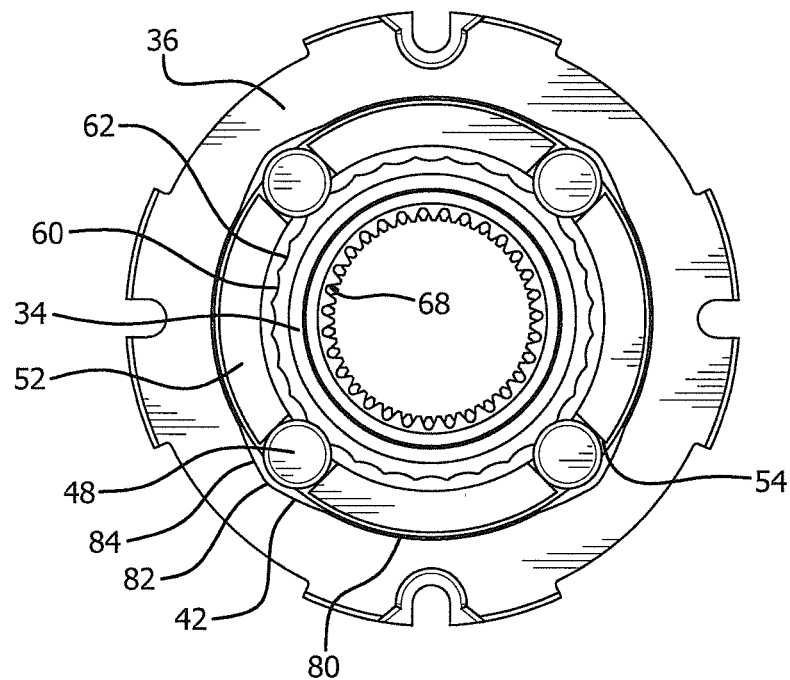
FIG. 6 is an end view of one embodiment of the clutch of FIG. 4, with an end cover removed, in a disengaged condition.

FIGS. 6 and 7 illustrate the bi-directional overrunning clutch prior to engagement. As shown, the rollers 48 of both roller assemblies 44, 46 are located between forward and reverse portions of the cam surface 42. More specifically, as shown in FIG. 6, the contour of cam surface 42 includes a plurality of peaks 80 and valleys 82. The number of valleys 82 is equal in number to the number of rollers 48 in each set. In the resting position, the rollers 48 are located within the valleys 82 with the cam surface 42 tapering inward toward the roll cage on either side of the rollers 48 (generally referred to herein as tapered portions 84). The valleys 82 are sufficiently deep that when a roller 48 is in the middle of a valley 82 the roller 48 can move radially outwards far enough to pass over the cusp between adjacent recesses 62 in the scalloped surface 60. The peaks 80 are sufficiently high that even when the rollers 48 are fully seated in recesses 62 in the scalloped surface 60, the rollers cannot pass under the peaks 80, but instead wedge on the tapered portions 84.

For ease of manufacture and assembly, the cam surface 42 preferably has n-fold rotational symmetry about the main axis of the clutch, where there are n rollers 48 in each roll cage, and preferably has mirror symmetry about any plane including the axis and passing through the center of a peak 80 or valley 82, and the roll cages 50, 52 and hubs 32, 34 have the same symmetry. The clutch can then be assembled without requiring any specific alignment of the components. A configuration in which there are an even number of tongues 56 and respective notches 58, and each roll cage 50, 52 has half the tongues 56 and half the notches 58, with tongues and notches alternately on each roll cage 50, 52, for example, each roll cage 50, 52 has one tongue 56 and one notch 58, diametrically opposite each other, allows for easy assembly using identical parts for both roll cages. However, because the roll cages cannot rotate relative to the housing more than the width of one valley, that level of symmetry is not essential, and may be departed from for other reasons. For operational purposes, it is believed that at least three rollers 48 on each roller assembly 44, 46 are desirable, and at least two pairs of a tongue 56 and a notch 58 are desirable, to ensure stable operation. A larger number of either or both of those features may be desirable, especially for clutches carrying large torques.

The cam surface 42, hubs 32, 34, and rollers 48 provide the bi-directional overrunning capabilities as will be discussed hereinafter. Cam surfaces and roll cages in overrunning clutches are well known in the art. See, e.g., above-mentioned U.S. Pat. Nos. 6,722,484 and 5,971,123, and also 4,373,407 to Okubo, which are each incorporated herein by reference in its entirety. A detailed discussion of the features of a cam surface is therefore not needed.

In the neutral or resting position shown in FIG. 6, the hubs 32, 34 are not engaged to the clutch housing 36 because the rollers 48 are not wedged between the clutch housing 36 and the hubs 32, 34. However, because the garter springs 64 hold the rollers 48 into the recesses 62 of the scalloped surfaces 60 of the hubs 32, 34, the roll cages 50, 52 are connected to the hubs 32, 34, causing each roll cage 50, 52 to move with its respective hub 32, 34. As a result, any relative motion between the clutch housing 36 and the hub 32 or 34 will cause the respective roll cage 50 or 52 to index or position the rollers 48 for engagement. Hence, although the resting position of the rollers shown in FIG. 6 theoretically provides no direct torque transfer between the input gear 38 and the hubs, in reality, positive drive occurs essentially instantaneously upon any movement. For example, in the embodiment illustrated, engagement occurs with as little as 8 degrees of rotation.

Figure 8:
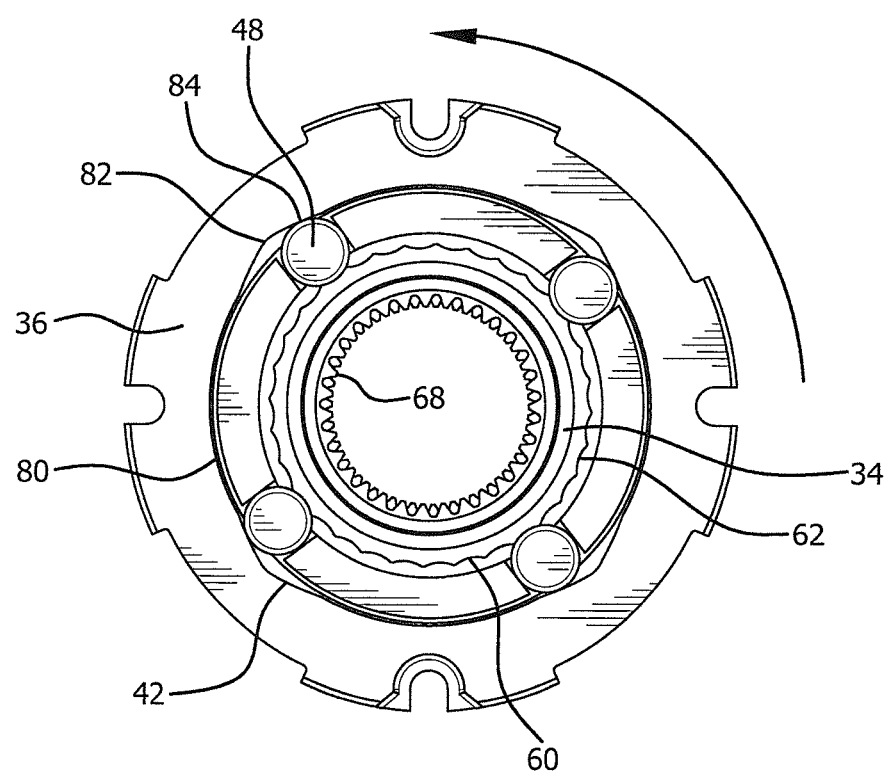
FIG. 8 is an end view similar to FIG. 6 of the clutch of FIG. 4 in a forward-driving condition.

Referring now to FIG. 8, the bi-directional clutch is shown with the roller assembly in its forward-engagement position. As discussed above, when the drive system of the vehicle 10 is engaged for forwardly driving the vehicle, the motor 16 causes the clutch housing 36 to rotate with respect to the frame 14 of the vehicle 10 in the direction of the arrow in FIG. 8. Because the hubs 32, 34 are engaged to the wheels 26, 28 through the shaft segments 22, 24, the hubs initially do not move. However, as explained above, the roll cages 50, 52 are connected by the rollers 48, held in place by the garter springs 64, to rotate with the hubs 32, 34. As a result, the rollers 48 wedge between the forward tapered portions 84 of the cam surface 42 and the hub 32, 34. The wedging of the rollers 48 provides a path for the transmission of torque from the input gear 38 through the rollers 48 to the hubs 32, 34, and thus to the shafts 22, 24. This represents the forward-engagement position of the bi-directional clutch which permits the motor-driven rotation of the hubs 32, 34 and the associated shaft segments 22, 24 and wheels 26, 28.

In this forward-engagement position shown in FIG. 8, the tongues 56 are in the middles of the notches 58, identically to the position shown in FIG. 7, because the two roll cages 32, 34 have moved in step with one another from the position of FIG. 6 to the position of FIG. 8, so that the two roll cages 50, 52 are not engaged with each other. This alignment is determined by the positions of the slots 54 that contain the rollers 48, relative to the tongues 56 and notches 58, as long as the rollers 48 of both roller assemblies 44, 46 are wedged on the tapered portions of the cam surface 42 of the housing 36.

The above-described construction of the bi-directional clutch 30, however, also allows the shaft segments 22, 24 to separately overrun (disengage) from the forward-engagement position. This is particularly important during turning where it is beneficial to permit one wheel (i.e., the outer wheel) to turn faster than the other wheel (i.e., the inner wheel), while the motor 16 continues to drive the slower wheel, and thus to propel the vehicle 10. This prevents scuffing and resultant wear of the slower moving wheel.

More importantly, the overrunning greatly reduces the effort required to steer the vehicle. The present invention achieves this goal in the drive axle 22, 24 by allowing each hub 32, 34 to overrun separately, i.e. to rotate independent from the clutch housing 36, when the hub 32, 34 rotates faster than the clutch housing 36.

Figure 9:
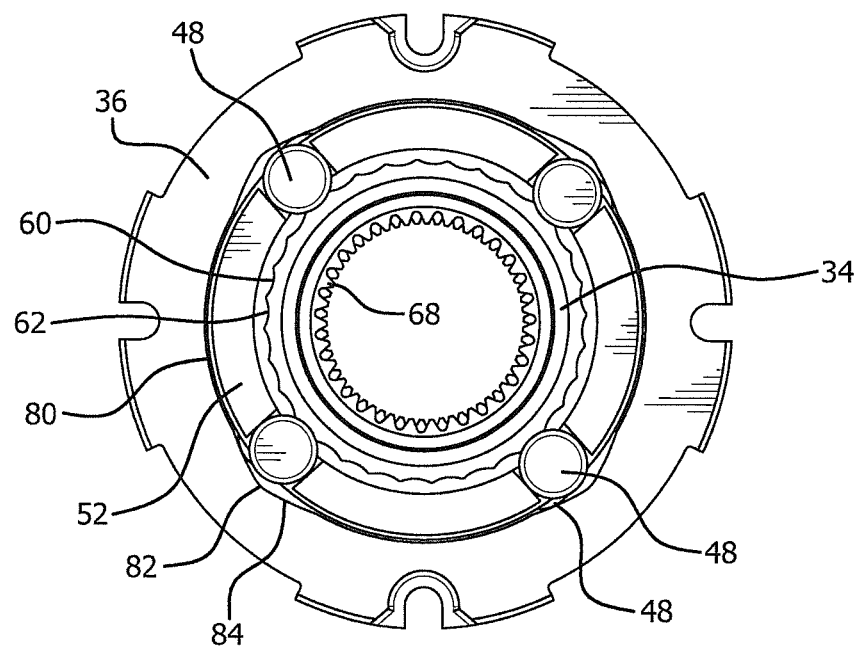
FIG. 9 is an end view similar to FIG. 6 of the clutch in a condition where the vehicle is turning.

The overrunning condition of the clutch 30 during the turning of the vehicle 10 is illustrated in FIGS. 9 and 10. As described previously, in the forward-engagement position shown in FIG. 8, the rollers 48 of both hubs 32, 34 are wedged between the forward tapered portions 84 of the cam surface 42 and the scalloped surfaces 60 of the hubs 32, 34. When the vehicle 10 is directed into a right turn in the forward driven mode as shown in FIG. 3, the hub 34 engaged with the left-hand shaft segment 24 will tend to turn faster than the hub 32 engaged with the right-hand shaft segment 22. As a result, the motor 16 will continue to drive the right-hand hub 32, shaft segment 22, and wheel 26, but the other hub 34 and the associated shaft segment 24 will overrun the clutch, carrying the associated roller assembly 46 forward.

The movement of roller assembly 46 relative to roller assembly 44 and housing 36 will stop when the tongues 56 engage the ends of the notches 58 as shown in FIG. 10, preventing further movement of the roller assembly 46 relative to the roller assembly 44. The difference in the circumferential length of the tongues 56 and notches 58 is chosen so that with the roller assembly 44 still wedged against the tapered portion 84 of the cam surface 42, the rollers 48 of roller assembly 46 are positioned in the centers of the valleys 82 of cam surface 42. As the wheel 28 continues to drive the hub 34 faster than the hub 32 and the housing 36, the cusps at the rear edges of the recesses 62 in the scalloped surface 60 will push against the rollers 48 in roller assembly 46. Because those rollers are in the valleys 82, they are retained only by the garter spring 64. The rollers 48 will therefore be lifted outwards, allowing the cusps to pass underneath, and will then drop into the next recess 62. This will happen repeatedly, as long as the vehicle 10 is turning and the wheel 28 is moving faster than the wheel 26.

It is expected that any audible click as the rollers drop into the recesses 62 will in practice be imperceptible over the normal noise of operation of vehicle 10, especially if motor 16 is an internal combustion engine.

Upon reentering a straight path following the turn, the rotational speed of the overrunning shaft segment will equalize with the rotational speed of the driven shaft segment and the clutch housing 36. The equalization of the relative speeds causes the rollers 48 to once again wedge between the tapered portion 84 of the cam surface 42 of the clutch housing 36 and the respective hub 32, 34 in the forward-engagement position, whereupon both axles are again driven by the input gear 38.

Because of the symmetry of the clutch 30, an exactly similar mirror-image process will occur during a left turn, as shown in FIG. 2.

Referring again to FIGS. 6 and 8, the cam surface 42 includes reverse-engagement surfaces, which are the tapered portions 84 opposite the forward-engagement surfaces associated with the forward-engagement position shown in FIG. 8. As a result, the clutch is bi-directional, permitting it to be reversibly driven, and functions in reverse exactly the same way as it functions in forward motion. For example, if the vehicle 10 in the illustrated embodiment is designed with a reverse gear, upon shifting to reverse, the input gear would turn the opposite way from the illustrated embodiment of FIG. 8. Thus, the rollers would engage with the tapered portions 84 associated with the reverse-engagement position. The bi-directional clutch 30 according to the present embodiment permits torque transfer (driving) equally in such a reverse direction. Furthermore, as with the forward driving of the vehicle, the present invention also permits overrunning in the reverse direction.

Another aspect of the bi-directional clutch according to the present embodiment is that it permits backdriving, which has particular importance in situations where it is necessary or desirable to prevent the wheels from rotating faster than the input gear 38. For example, when the vehicle 10 is being operated on a descending slope, the speed of the wheels 26, 28 may tend to go faster than the speed of the input gear 38. In a vehicle with conventional single direction overrunning clutches, the wheels would then overrun and the machine would be free-wheeling (uncontrolled). In the clutch 30 shown in the drawings, if both wheels 26, 28 overrun the speed of the input gear 38, the tongues 56 and notches 58 will not engage to restrain the movement of the roller assemblies 44, 46. Therefore, both roller assemblies will advance until the rollers 48 engage the reverse-engagement tapered portions 84 of the cam surface 42. In that position, the wheels 26, 28 are backdriving torque into the motor 16, which can act as a brake on the wheels. The shift of the roll cage 42 to the reverse-engagement clutch position therefore provides for controlled operation of the vehicle 10 on a descending slope, forcing the wheels 26, 28 to rotate at the same relative speed as the rotational speed of the clutch housing 36 and input gear 38.

In that state, it may be seen that the overrunning clutch will still operate to permit one wheel to disengage from the motor 16 on a turn, but now the faster-moving (outside) wheel is back-driving the motor 16, while the slower-moving wheel is disengaged.

The embodiment of clutch shown in the drawings is a compact design which would work well in conventional two-wheel drive walk behind and light duty machines and vehicles where overrunning is needed on the primary drive axle. The invention, however, is also equally applicable for providing positive drive for heavy duty machines and vehicles, such as 2 and 4 wheel drive vehicles.

The present invention can be used with many types of drive devices where overrunning of the primary shaft segments is necessary. The clutch of the present invention is also not limited to use with single-axle walk behind equipment, but may be used for controlling a driven axle on multiple axle machinery, as well as ridden vehicles such as a golf cart, for example.

Whenever the clutch 30 is under load, at least one set of rollers 48 is wedged between the hub 32, 34 and the tapered portions of the cam surface 42. The housing 36 and input gear 38 are thus wedged to at least one of the output shafts 22, 24, and are supported by the bearings for the output shafts 22, 24. A separate bearing to support the clutch 30 and input gear 38 is therefore not needed, which can afford a considerable simplification and economy in the construction of the clutch assembly. However, additional bearings to support the clutch housing 36 and input gear 38 can of course be provided, and may be desired especially in heavier duty embodiments.

In the described embodiment, each roller assembly 44, 46 is encircled by a garter spring 64 that biases the rollers 48 inwards, into engagement with the hub 32, 34. However, coil springs or other forms of spring may be used, including separate springs for each roller. Other mechanisms may be used, provided that the rollers 48 are biased or urged inwards sufficiently that in the unengaged position the rollers 48 remain in engagement with the hubs 32, 34, but in the turning position the rollers 48 of the wheel that is overrunning can index from one groove 62 to the next.

While the above invention has been described as being applicable to the clutch arrangement shown in the figures, it can also be readily incorporated into a split roll cage assembly such as the one shown in U.S. Pat. No. 8,919,513, which is incorporated herein by reference in its entirety. A person skilled in the art would be readily capable of incorporating the scalloped hubs surface described above into the hubs of U.S. Pat. No. 8,919,513. In this alternate embodiment, the tongues 56 and notches 58 are replaced with an adapter that is configured to engage with the slots for the rollers.

Although the present invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A bi-directional overrunning clutch for controlling torque transmission to shaft segments of a primary drive axle of a wheeled machine, the bi-directional overrunning clutch comprising:
    a clutch housing adapted to be engaged to and rotated by an input, the clutch housing having an inner cam surface on it;
    a pair of hubs each adapted to engage an end of a respective shaft segment of a drive axle for rotation therewith, each hub having a plurality of axially-extending recesses on an outer surface;
    a pair of roller assemblies disposed within the clutch housing, each roller assembly including
    a set of rollers positioned around at least a portion of one of the hubs,
    a roll cage having a plurality of slots, each roller being located within a slot, the roll cage being located about at least a portion of the respective hub, and
    a spring tending to urge the rollers radially inwards to seat in respective ones of the recesses in the respective hub;
    each roller assembly being located adjacent to the inner cam surface, the inner cam surface adapted to provide wedging engagement of the rollers between the inner cam surface and the respective hub when the roll cage is rotated in a first direction relative to the clutch housing into a forward-engagement position and when the roll cage is rotated in a second direction relative to the clutch housing into a reverse-engagement position, the second direction of rotation being opposite the first, the inner cam surface defining a released position of the rollers between said forward-engagement position and said reverse-engagement position in which radially outward movement of the rollers is permitted against the action of the spring to free the rollers from the recesses in the respective hub to permit relative rotation of the hub and the respective roller assembly;
    the roll cages engaging each other for limited relative rotation such that when one roller assembly is in one of the forward-engagement position and the reverse-engagement position, the other roller assembly cannot move into the opposite direction of the forward-engagement position and the reverse-engagement position.

2. The bi-directional overrunning clutch according to claim 1, wherein the spring of each roller assembly comprises a garter spring encircling the rollers.

3. The bi-directional overrunning clutch according to claim 2, wherein the rollers are grooved, the garter springs are seated in the grooves, and the depth of the grooves is greater than the thickness of the garter springs.

4. The bi-directional overrunning clutch according to claim 1, further comprising at least one tongue on at least one of the roll cages received in a respective notch in the other of the roll cages, the notch having a greater circumferential length than the tongue, wherein the difference in the circumferential lengths of the tongue and the notch deteimines the amount of the limited relative rotation of the two roll cages.

5. The bi-directional overrunning clutch according to claim 1, further comprising at least one adapter positioned between the roll cages for providing the engagement between the roll cages.

6. The bi-directional overrunning clutch according to claim 1, wherein the rollers are evenly spaced around each roll cage, the recesses are evenly spaced around each hub, and the number of recesses is a whole multiple of the number of rollers.

7. The bi-directional overrunning clutch according to claim 1, further comprising an input gear encircling the clutch housing, wherein the input gear includes teeth that are formed about an outer circumference of the input gear and wherein the inner cam surface is formed on or secured to an inner diameter of the input gear.

8. The bi-directional overrunning clutch according to claim 7, wherein the clutch is mounted in a vehicle, the vehicle having a drive axle that includes two shaft segments, and wherein each shaft segment is drivingly engaged with one of the hubs, the vehicle including a motor with an output shaft that is engaged with the input gear for transmitting rotary motion to the input gear.

9. The bi-directional overrunning clutch according to claim 8, wherein the hubs include splined ends for engaging with mating splined ends on the shaft segments.

10. The bi-directional overrunning clutch according to claim 1, wherein the input comprises an input gear adapted to be engaged with an input shaft for transmitting rotation of the input shaft into rotation of the input gear, the input gear being engaged to the clutch housing to rotate the clutch housing with the input gear.

11. A bi-directional overrunning clutch comprising:
    a pair of hubs, adapted to receive respective ones of a pair of coaxial output shafts, for rotation of each hub with its respective shaft about a common axis of the shafts, each hub having on an outer circumference axially-extending ridges and recesses;
    a pair of roller assemblies, each surrounding one of the hubs and comprising:
    a set of rollers parallel to the axis,
    a roll cage receiving and guiding the set of rollers, and
    a garter spring encircling the roll cage and the set of rollers, and urging the rollers inwards to seat in the recesses in the respective hubs, the garter spring permitting the rollers to move outward and pass over the ridges of the respective hub from recess to recess under relative rotation of the roller assembly and the hub about the common axis,
    the roll cages engaging each other for limited relative rotation about the common axis; and
    a housing surrounding the roller assemblies and having an inner cam surface with inwardly projecting peaks and outwardly receding valleys joined by tapered portions, the cam surface dimensioned so that when the rollers of a roller assembly are seated in recesses of the respective hub, the rollers wedge on the tapered portions and do not pass under the peaks of the cam surface, and when the rollers of a roller assembly are aligned with valleys of the cam surface, the valleys accommodate sufficient outward movement of the rollers to pass over the ridges of the respective hub;

wherein at a limit of the limited relative rotation of the roll cages about the common axis, the rollers of one roller assembly are aligned with the valleys of the cam surface when the rollers of the other roller assembly are wedged on the tapered portions of the cam surface.

12. The bi-directional overrunning clutch according to claim 11, wherein there are equal numbers of evenly spaced rollers in each roller assembly, there are equal numbers of evenly spaced recesses on each hub, and the number of recesses on each hub is an integer multiple of the number of rollers in each roller assembly, and the valleys are evenly spaced and the number of valleys is equal to the number of rollers in each roll cage.

13. The bi-directional overrunning clutch according to claim 11, further comprising an input gear integral with or attached to the housing, and coaxial with the common axis.

14. The bidirectional overrunning clutch according to claim 11, wherein the hubs further comprise splines for non-rotational connection to the shafts.

15. The bidirectional overrunning clutch according to claim 11, further comprising a motor connected to rotate the housing about the common axis, and ground-engaging wheels connected to the hubs by the output shafts to be rotated by the hubs.

16. The bi-directional overrunning clutch according to claim 11, further comprising at least one tongue on at least one of the roll cages received in a respective notch in the other of the roll cages, the notch having a greater circumferential length than the tongue, wherein the difference in the circumferential lengths of the tongue and the notch determines the amount of the limited relative rotation of the two roll cages.

17. The bi-directional overrunning clutch according to claim 11, further comprising at least one adapter positioned between the roll cages for providing the engagement between the roll cages.

* * * * *